United States Patent
Hänninen et al.

(10) Patent No.: US 7,058,409 B2
(45) Date of Patent: Jun. 6, 2006

(54) PERSONAL SAFETY NET

(75) Inventors: Mika Hänninen, Nummenkylä (FI); Hannu Veini, Helsinki (FI); Harri A. Alto, Riihimäki (FI)

(73) Assignee: Nokia Corporation, Espoo (FI)

( * ) Notice: Subject to any disclaimer, the term of this patent is extended or adjusted under 35 U.S.C. 154(b) by 549 days.

(21) Appl. No.: 10/098,335

(22) Filed: Mar. 18, 2002

(65) Prior Publication Data

US 2004/0203842 A1   Oct. 14, 2004

(51) Int. Cl.
*H04Q 7/20* (2006.01)
*H04Q 7/32* (2006.01)

(52) U.S. Cl. ............... 455/456.1; 455/456.3; 455/456.5; 455/456.6; 455/521; 455/404.1; 455/404.2; 455/557; 348/14.01; 348/14.02; 348/207.99; 348/207.1

(58) Field of Classification Search ............ 455/550.1, 455/456.1–457, 422.1, 517, 556.1, 557, 403, 455/414.1, 414.2, 404.1, 404.2, 412.1, 412.2, 455/456.2, 456.3, 456.4, 456.5, 456.6, 500, 455/414.4, 414.3, 426.1, 426.2, 521, 575.1, 455/90.1, 90.2, 90.3; 348/14.01, 14.02, 207.99, 348/207.1
See application file for complete search history.

(56) References Cited

U.S. PATENT DOCUMENTS 5,806,005 A * 9/1998 Hull et al. ................. 455/566
5,893,037 A * 4/1999 Reele et al. .............. 455/556.1
6,393,274 B1 * 5/2002 Peltonen ................... 455/414.1
6,499,016 B1 * 12/2002 Anderson .................... 704/275
6,741,864 B1 * 5/2004 Wilcock et al. .......... 455/456.1
2002/0137528 A1 * 9/2002 Fraccaroli ................... 455/457
2002/0193124 A1 * 12/2002 Hamilton et al. .......... 455/456
2003/0098784 A1 * 5/2003 Van Bosch et al. ...... 340/425.5
2003/0148771 A1 * 8/2003 de Verteuil ................ 455/456
2003/0157960 A1 * 8/2003 Kennedy .................... 455/556
2004/0087315 A1 * 5/2004 Dufva et al. .............. 455/456.1

* cited by examiner

*Primary Examiner*—Keith Ferguson
(74) *Attorney, Agent, or Firm*—Squire, Sanders & Dempsey, L.L.P.

(57) ABSTRACT

A personal safety net includes a mobile terminal, a server including a memory to store data, and a communications network to transmit data between the mobile terminal and the server. The mobile terminal may include an image data generator, such as a camera, to generate image data and a voice data generator, such as a microphone, to generate voice data. The mobile terminal further includes an output device to transmit the data to the communications network. The server stores, in its memory, the data transmitted from the output device of the mobile terminal to the network operator server via the communications network. A location data generator, located within either the mobile terminal or the communications network, for example, may be included to generate location data as to the location of the mobile terminal, the location data also being stored in the server.

60 Claims, 2 Drawing Sheets

PERSONAL SAFETY NET

BACKGROUND OF THE INVENTION

1. Field of the Invention

The present invention relates to a personal safety net and more particularly to a personal black box contained within a mobile terminal to receive, store if necessary, and transmit to a remote location for secure storage: image data, voice data, and location data which can be subsequently used to provide a useful record of crimes and accidents.

2. Description of the Related Art

Presently, there is no personal black box mechanism which allows a user to receive, store if necessary, and transmit to a remote location for secure storage: image data, voice data, and location data which can be subsequently used to provide a useful record of crimes and accidents. While security cameras have been disposed at fixed locations in businesses, office buildings, apartment houses, and even streets in high crime rate areas in cities, they cover only a small part of the total area, thereby allowing crimes and accidents to occur without being recorded by these security cameras.

SUMMARY OF THE INVENTION

In view of the above, it is an object of the invention to provide a personal safety net arrangement which allows a mobile terminal of a user to receive, store if necessary, and transmit to a server disposed at a remote location for secure storage: image data, voice data, and location data which can be subsequently used to provide a useful record of crimes and accidents, for example.

In the present invention, image data is obtained by a camera, such as a digital camera, which may be located either internally within the mobile terminal or external to the mobile terminal and electrically connected thereto by a cable, for example, or by a wireless transmission means, such as Bluetooth.

A microphone, normally disposed within the mobile terminal, is used to obtain voice data. The microphone may also be disposed external to the mobile terminal, for example, within or adjacent to the external camera.

A GPS (Global Positioning System), or other positioning arrangements, may optionally be disposed within the mobile terminal to generate location data as to the location of the mobile terminal. In the absence of a GPS within the mobile terminal, location data, which may be limited to only the location of the cell in which the mobile terminal is located, may be generated by the wireless network and forwarded to the secure server along with the image and voice data.

All of the data is wirelessly transmitted by the mobile terminal via the usual mobile terminal network to a remotely located secure server where the data is stored for a predetermined period of time, such as two hours. Alternatively, if the mobile terminal is in an area not covered by the mobile network, the data may be stored in the mobile terminal for later transmission by the mobile terminal via the mobile terminal network to the secure server.

The stored data may be subsequently retrieved by the user of the mobile terminal or by the appropriate authority upon the permission of the user if the data is needed in the case of a crime or accident or for any other purpose.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
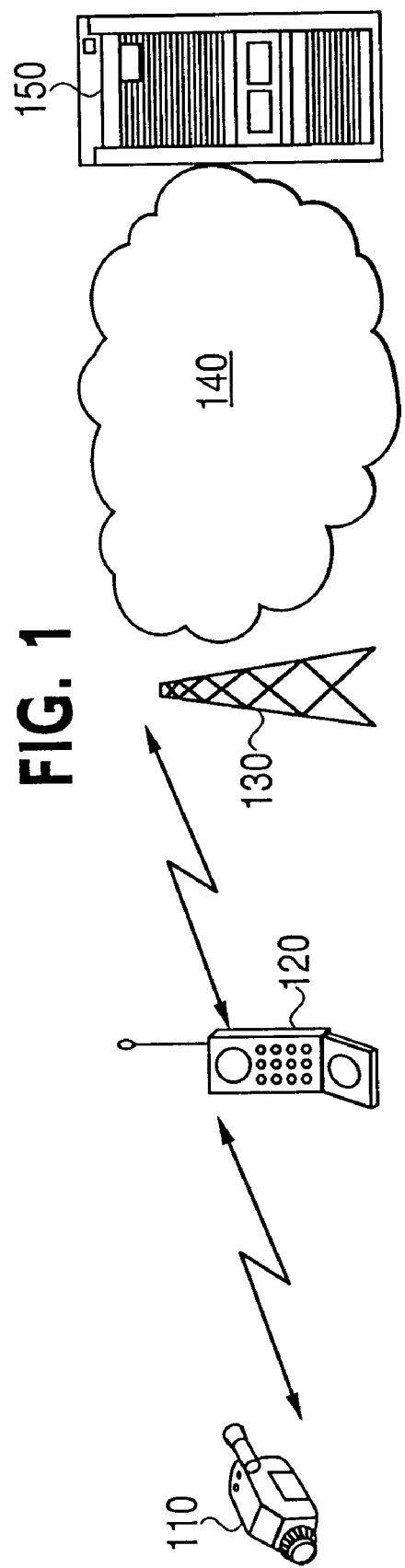
FIG. 1 illustrates the arrangement of elements of a personal safety net in accordance with an embodiment of the present invention.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Arrangements may be shown a block diagram form in order to avoid obscuring the invention and also in view of the fact that specifics with respect to implementation of such block diagram arrangements are highly dependent upon the platform within which the present invention is to be implemented, that is, such specifics should be well within purview of one skilled in the art. Where specific details are set forth in order to describe example embodiments of the invention, it should be apparent to one skilled the art that the invention can be practiced without, or with variations of, the specific details. Finally, it should be apparent that differing combinations of hard-wired circuitry and software instructions can be used to implement embodiments of the present invention, that is, the present invention is not limited to any specific combination of hardware and software.

FIG. 1 illustrates the arrangement of elements of a personal safety net in accordance with an embodiment of the present invention. As illustrated in FIG. 1, a mobile terminal 120 is normally equipped with a microphone which may be used to generate voice data signals which are then digitized within the mobile terminal into voice data. Alternatively, an external microphone may be used, for example, a microphone may be included with an external digital camera 110.

The digital camera 110, which may be either external to the mobile terminal 120 or integrated within the mobile terminal 120, generates image data. There are several alternatives as to the image data generated by the digital camera. Namely, the digital camera can produce continuous real-time video data for use in very high security situations. However, even using video compression technology to compress the real-time video data, the compressed real-time video data nevertheless requires a very large bandwidth and a considerable amount of storage space, thereby making continuous real-time video data not very practical in most applications.

Alternatively, the digital camera can effect time-lapse techniques to periodically produce still picture image data. That is, the digital camera may produce still picture image data every two seconds or four seconds or ten seconds, etc., the repetition rate being dependent upon the level of security required, for example, one picture image every two seconds in a high security situation and one picture every ten seconds in a low security situation.

If the digital camera 110 is external to the mobile terminal 120, the image data generated by the digital camera 110, as well as voice data generated by an external microphone if such an external microphone is used, may be transmitted to the mobile terminal 120 via any commonly used wireless transmission technique, such as Bluetooth, or may be a wired connection if the digital camera, and an external microphone, if included, is attached near the shoulder of a user's garment in an arrangement analogous to the placement of a microphone of a security guard's walkie talkie, for example.

A GPS may optionally also be disposed within the mobile terminal 120 or external to the mobile terminal 120 and connected thereto. Such a GPS, which is already available in some mobile terminals, generates location data based on reception of radio signals from a plurality of geo-synchronous satellites.

The image data and voice data and location data, if available, are transmitted by the mobile terminal 120 to the nearest mobile network base station 130 as with any other transmission between the mobile terminal 120 and the mobile network base station 130. There are several alternatives modes of transmission of the data from the mobile terminal 120 to the nearest mobile network base station 130. Namely, in a high security situation, the transmission may be continuous. However, in view of the limited battery life of present-day mobile terminals, the continuous transmission of data is not very practical in most applications.

Alternatively, the mobile terminal 120 can store a specified amount of data and then transmit this stored data as a data burst transmission to the nearest mobile network base station 130. Furthermore, the data can be compressed by commonly used data compression technology prior to storage or prior to transmission. Using data burst transmission techniques and/or data compression technology to transmit data from the mobile terminal 120 to the nearest mobile network base station 130 can considerably extend the battery life of the mobile terminal.

In view of the fact that the mobile terminal 120 may occasionally be located outside of the range of its mobile network, a buffer memory may be included within the mobile terminal 120 to store the data for subsequent transmission to the nearest mobile network base station 130 upon the mobile terminal 120 being within the range of a base station of its mobile network.

The user of the mobile terminal 120 can program the mobile terminal 120 to automatically generate, store if necessary, and transmit data at predetermined time intervals or at predetermined times of day or only upon manual activation by the user. In addition, in some applications, the mobile terminal 120 can be programmed so that the storage and transmission of data to the nearest mobile network base station 130 can be remotely controlled via a transmission from the nearest mobile network base station 130 to the mobile terminal 120.

At the nearest mobile network base station 130, the mobile network terminal equipment can, upon instructions from the mobile terminal 120 or automatically, generate location data for the mobile terminal 120 based on the location of the nearest mobile network base station 130. That is, while the nearest mobile network base station 130 cannot determine the exact location of the mobile terminal 120, it can generate location data indicating that the mobile terminal 120 is within an area corresponding to the reception area of the nearest mobile network base station 130.

In any event, the nearest mobile network base station 130 transmits the data via a network 140, for example, a GSM or UMTS network, to a remotely located secure server 150 which may be located in a distant data center. The secure server 150, which may be either a server specifically dedicated for this purpose or which may be a server of the network operator which also performs other functions, is programmed to receive and store the transmitted data from a plurality of mobile terminals. The length of time that the data is stored by the secure server 150 depends upon the level of security needed. For example, in a very high security situation, it may be desirable to store the data for 24 hours or more, whereas in low security situations, it may only be necessary to store the data for one hour.

In order to secure the data from eavesdropping by an unauthorized third party, encryption techniques may be used to encrypt the data prior to transmission from the mobile terminal 120 to the secure server 150. Such encryption techniques can ensure that only the user of the mobile terminal 120 or an authorized entity in possession of the user's private key can access the user's data which is forwarded from the mobile terminal 120 via a mobile network base station 130 and network 140 to the secure server 150 for storage therein. This may be of considerable importance from a privacy standpoint in that the transmission of data between the mobile terminal 120 and the secure server 150 is not secure and is subject to eavesdropping by an unauthorized third party.

Normally, the secure server 150 is programmed such that the stored data can only be accessed by the mobile terminal user utilizing the usual security techniques, such as encryption, IDs and passwords, etc. Alternatively, the stored data can be accessed by a suitable authority, such as a local police department, upon the authorization of the terminal user or under the authorization of a court, for example, in the case of a crime or accident.

Furthermore, the mobile terminal 120 may have an emergency mode, activated by a "panic button" on the mobile terminal 120, for example, in which the data is automatically transmitted to a suitable authority, such as a 911 emergency service presently used for emergency telephone calls. In addition, in such an emergency mode, there may be an interactive control arrangement which allows the emergency service to control the operation of the mobile terminal 120, for example, to switch the camera operation from one still picture every two seconds to real-time video or to allow an emergency service operator to communicate with the user of the mobile terminal 120.

Figure 2:
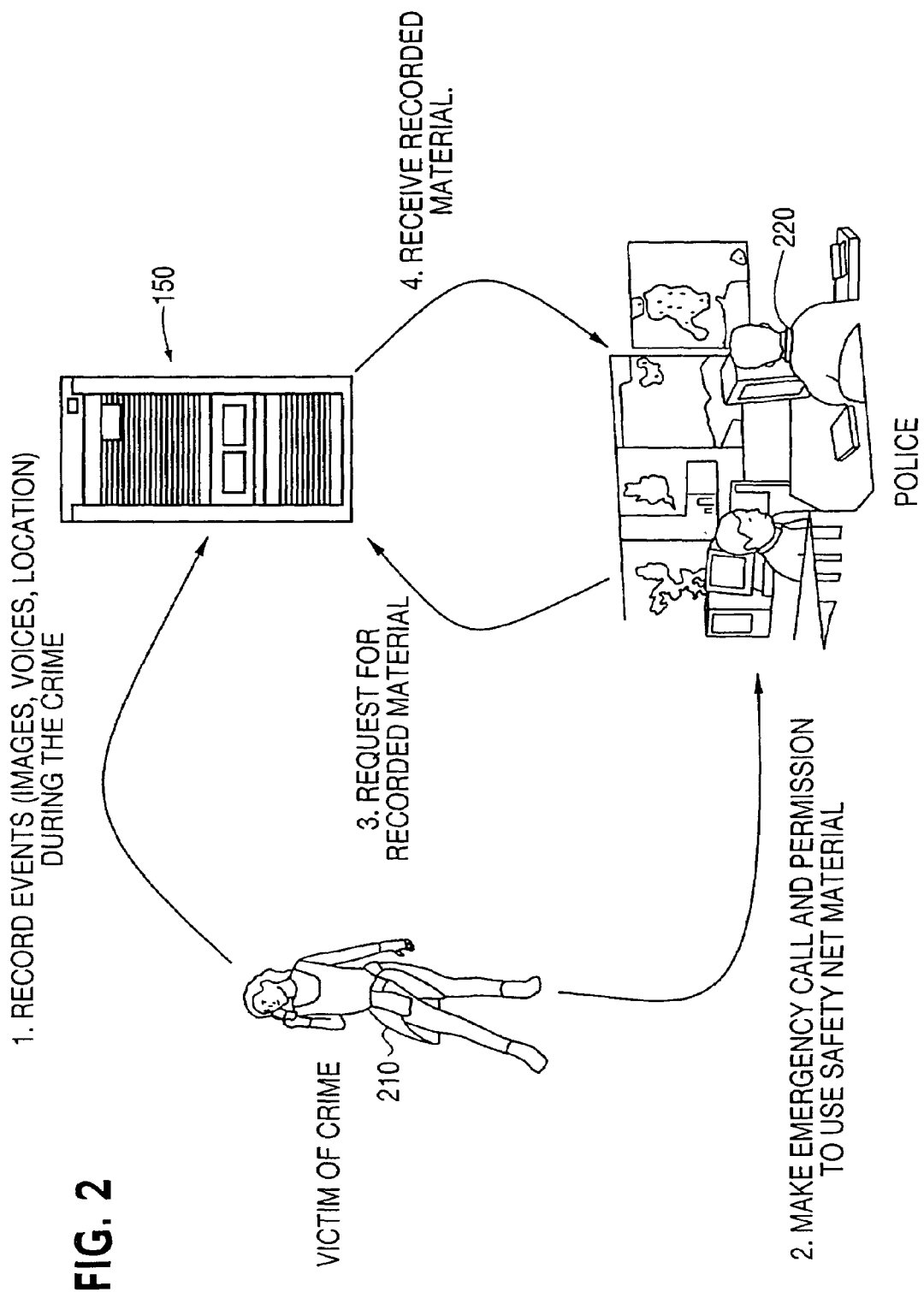
FIG. 2 illustrates the sequence of events in the operation of a personal safety net in accordance with an embodiment of the present invention.

FIG. 2 illustrates the sequence of events in the operation of a personal safety net in accordance with an embodiment of the present invention. As shown in FIG. 2, a crime victim 210 utilizes the personal safety net in accordance with the present invention to transmit and record the events occurring during the crime, that is, image data, voice data, and location data, utilizing the mobile terminal of the crime victim 210 to transmit the data to the remotely located secure server 150.

After the crime has been committed, the crime victim 210 makes an emergency call to the appropriate authorities, for example, the police 220, and gives them permission to access the image data, voice data, and location data stored in the secure server 150, the data being related to the events occurring during the crime.

The police 220 can then forward a request for access of the recorded data to the secure server 150 which in turn would forward the recorded data to the police 220, thereby allowing the police 220 to have immediate access to a recording of the events relating to the crime, and perhaps including an image of the perpetrator of the crime and/or an image which may be used to identify a vehicle of the perpetrator of the crime, etc.

The activation of the recording can be effected in several different ways. For example, the activation can be effected manually via keypad activation or voice activation. Activation can be effected based on location information, that is, when the user is in a specific predefined location or can be based on a predefined time of day, such as when the user is out of the office. Furthermore, activation can be effected by a predetermined authority such as the police.

This concludes the description of the example embodiments. Although the present invention has been described with reference to an illustrative embodiment thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A personal safety net system comprising:
   a mobile terminal;
   a server including a memory for storing data; and
   a communications network to transmit data captured by a user of the mobile terminal between the mobile terminal and the server; and wherein
   the mobile terminal comprises at least one image data generator to generate image data, at least one voice data generator to generate voice data, and at least one output device to transmit the image data and voice data to the communications network and a communication regarding an emergency from the user to another entity in the system providing authorization for the another entity to access the stored data captured during the emergency and the server stores in the memory at least image data captured during the emergency transmitted from the at least one output device of the mobile terminal to the server via the communications network and the server provides, in response to a request from the another entity, the stored data captured during the emergency to the communications network for transmission to the another entity whereby personnel associated with the another entity are provided with the data captured during the emergency so as to permit providing assistance to the user.

2. The system of claim 1, wherein the at least one image data generator comprises a camera.

3. The system of claim 2, wherein the camera is disposed within the mobile terminal.

4. The system of claim 2, wherein the camera is disposed external to the mobile terminal.

5. The system of claim 4, wherein image data is wirelessly transmitted from the camera to the mobile terminal.

6. The system of claim 5, wherein the wirelessly transmitted image data is transmitted via Bluetooth.

7. The system of claim 1, wherein the at least one voice data generator comprises a microphone.

8. The system of claim 7, wherein the microphone is disposed within the mobile terminal.

9. The system of claim 7, wherein the microphone is disposed external to the mobile terminal.

10. The system of claim 9, wherein voice data is wirelessly transmitted from the microphone to the mobile terminal.

11. The system of claim 10, wherein the wirelessly transmitted voice data is transmitted via Bluetooth.

12. The system of claim 1, further comprising a positioning system to generate location data as to the location of the mobile terminal.

13. The system of claim 12, wherein the at least one output device transmits the location data to the communications network.

14. The system of claim 13, wherein the server stores, in its memory, the location data transmitted from the output device of the mobile terminal to the network operator server via the communications network.

15. The system of claim 12, wherein the positioning system is selectively activated by at least one of the mobile terminal and the server.

16. The system of claim 12, wherein the positioning system comprises a GPS (Global Positioning System).

17. The system of claim 12, wherein the positioning system comprises a network based positioning system.

18. The system of claim 17, wherein the network based positioning system utilizes cell ID information and sector ID information.

19. The system of claim 17, wherein the mobile network generates location data as to location of the mobile terminal and wherein the server stores the location information in its memory.

20. The system of claim 17, wherein a SMLC (serving mobile location center) generates location data as to location of the mobile terminal and wherein the server comprises a memory, which stores the location data transmitted from the mobile network.

21. The system of claim 12, wherein the positioning system comprises a network assisted positioning system.

22. The system of claim 21, wherein the network assisted positioning system includes means to allow the mobile terminal to receive location information one of either directly from a satellite or from a network or to generate location information based on information sent to it by the network.

23. The system of claim 12, wherein the GPS is disposed within the mobile terminal.

24. The system of claim 12, wherein the GPS is disposed external to the mobile terminal.

25. The system of claim 12, wherein the at least one output device is activated upon entering a predefined area.

26. The system of claim 12, wherein the at least one mobile terminal further comprises a memory to store data prior to the output device transmitting the data to the communications network.

27. The system of claim 1, wherein the communications network comprises a mobile network base station.

28. The system of claim 1, wherein the communications network comprises a GSM network.

29. The system of claim 1, wherein the communications network comprises one of a UMTS network or IP-RAN network or TDMA network or CDMA network or WCDMA network or OFDM network.

30. The system of claim 1, wherein the output device automatically transmits data to the communications network.

31. The system of claim 30, wherein the at least one output device automatically transmits data to the communications network at least one of predetermined time intervals or predetermined times a day.

32. The system of claim 1, wherein the at least one output device only transmits data to the communications network upon manual activation by a user.

33. The system of claim 1, wherein the at least one output device is remotely activated to transmit data to the communications network.

34. The system of claim 1, wherein the at least one mobile terminal further comprises a memory to store data prior to the output device transmitting the data to the communications network.

35. The system of claim 1, wherein the mobile terminal further comprises an encryption means to encrypt the data prior to transmission by the output device to the communications network.

36. A mobile terminal of a personal safety net system including a network operated server including a memory for storing data and a communications network for transmitting data captured by a user of the mobile terminal between the mobile terminal and the network operator server, the mobile terminal comprising:
at least one image data generator to generate image data, at least one voice data generator to generate voice data, and at least one output device to transmit the image data and voice data to the communications network and a communication regarding an emergency from the user to another entity in the system providing authorization for the another entity to access the stored data captured during the emergency and the server stores in the memory at least image data captured during the emergency transmitted from the at least one output device of the mobile terminal to the server via the communications network and the server provides, in response to a request from the another entity, the stored data captured during the emergency to the communications network for transmission to the another entity whereby personnel associated with the another entity are provided with the data captured during the emergency so as to permit providing assistance to the user.

37. The mobile terminal of claim 36, wherein location information is stored in the memory.

38. The mobile terminal of claim 36, wherein the at least one image data generator comprises a camera.

39. The mobile terminal of claim 38, wherein the camera is disposed within the mobile terminal.

40. The mobile terminal of claim 36, wherein the camera is disposed external to the mobile terminal.

41. The mobile terminal of claim 40, wherein image data is wirelessly transmitted from the camera to the mobile terminal.

42. The mobile terminal of claim 41, wherein the wirelessly transmitted image data is transmitted via Bluetooth.

43. The mobile terminal of claim 36, wherein the at least one voice data generator comprises a microphone.

44. The mobile terminal of claim 43, wherein the microphone is disposed within the mobile terminal.

45. The mobile terminal of claim 43, wherein the microphone is disposed external to the mobile terminal.

46. The mobile terminal of claim 45, wherein voice data is wirelessly transmitted from the microphone to the mobile terminal.

47. The mobile terminal of claim 46, wherein the wirelessly transmitted voice data is transmitted via Bluetooth.

48. The mobile terminal of claim 36, further comprising a GPS (Global Positioning System) to generate location data as to the location of the mobile terminal; and
wherein the at least one output device transmits the location data to the communications network; and
wherein the network operator server stores, in the memory, the location data transmitted from the at least one output device of the mobile terminal to the network operator server via the communications network.

49. The mobile terminal of claim 48, wherein the GPS is disposed within the mobile terminal.

50. The mobile terminal of claim 48, wherein the GPS is disposed external to the mobile terminal.

51. The mobile terminal of claim 36, wherein the at least one output device automatically transmits data to the communications network.

52. The mobile terminal of claim 51, wherein the at least one output device automatically transmits data to the communications network at least one of predetermined time intervals or predetermined times a day.

53. The mobile terminal of claim 36, wherein the at least one output device only transmits data to the communications network upon manual activation by a user.

54. The mobile terminal of claim 36, wherein the at least one output device is remotely activated to transmit data to the communications network.

55. The mobile terminal of claim 36, further comprising a memory to store data prior to the output device transmitting the data to the communications network.

56. The mobile terminal of claim 36, further comprising an encryption means to encrypt the data prior to transmission by the output device to the communications network.

57. A method of operating a mobile terminal of a personal safety net system having a server including a memory for storing data and a communications network for transmitting data between the mobile terminal and the server, the method comprising:
the mobile terminal generating image data and voice data which is transmitted to the server by the communications network and stored in the memory;
transmitting at least image data during an emergency from the mobile terminal to the communications network and to the server and stored in the memory; and
transmitting a communication regarding the emergency from the user of the mobile terminal to another entity in the system providing the another entity access to the data captured during the emergency and stored in the memory and the server provides, in response to a request from the another entity, the stored data captured during the emergency to the communications network for transmission to the another entity whereby personnel associated with the another entity are provided with the data captured during the emergency so as to permit providing assistance to the user.

58. The method of claim 57, further comprising generating location data and storing it in the memory of the server.

59. The method of claim 58, wherein a user of the mobile terminal selectively commands the generation and storage of image and voice data.

60. The method of claim 59, wherein the user of the mobile terminal selectively commands the generation and storage of location data.

* * * * *